May 29, 1951     A. S. MACKEY     2,554,949
POULTRY BAND

Filed Aug. 8, 1947     2 Sheets-Sheet 1

INVENTOR
ALEXANDER S. MACKEY
By: Fetherstonhaugh & Co.
ATT'YS

May 29, 1951            A. S. MACKEY            2,554,949
POULTRY BAND

Filed Aug. 8, 1947                                  2 Sheets-Sheet 2

INVENTOR
ALEXANDER S. MACKEY
By: Fetherstonhaugh & Co
ATT'YS

Patented May 29, 1951

2,554,949

UNITED STATES PATENT OFFICE 2,554,949

POULTRY BAND

Alexander S. Mackey, Ottawa, Ontario, Canada, assignor to Ketchum Manufacturing Co. Limited, Ottawa, Ontario, Canada Application August 8, 1947, Serial No. 767,619

6 Claims. (Cl. 40—3)

This invention relates to poultry bands.

In the poultry band art a large number of poultry bands are secured around the leg of the bird by means of special tools. This makes it necessary to go through a complex operation in applying the band to the leg of the bird and in some cases, will result in injury to the bird. Moreover, in a case of this kind, it is necessary to leave the band fairly loose in order that the securing tool may be inserted between the band and the leg of the bird. In other cases, the locking elements of the band require a certain bulkiness of construction.

The present invention embodies a self-locking band which generally avoids the foregoing disadvantages. It is, therefore, an object of the present invention to provide a simple poultry band, the free ends of which are designed to inter-lock with one another in a simple operation thus to provide a self-locking poultry band which may be applied quickly and efficiently.

A further object of the invention is to provide a poultry band of this kind wherein the interlocking parts are such that they provide a good target relatively to one another so that the band can be readily locked.

A still further object of the invention is to provide a band of this character wherein the inter-locking parts are comparatively small so that the resulting band does not embody a bulkiness of construction.

A still further object of the invention is to provide a band of this character which can be made as a very light element and which will encircle the leg of the bird neatly without providing a looseness which is necessary in the case of bands which are secured by clinching tools.

With these and other objects in view, the invention generally comprises a band, the free ends of which are formed with mating enclosing housings open at one end and including co-operating elements in each designed to enter the open portion of the opposite housing, said housings including sloped projecting tongues designed to overlap other portions of the housings when the latter are inter-engaged thereby to retain the housings in locked inter-engagement by means of a double securement. The invention will be clearly understood by reference to the following detailed specification taken in conjunction with the accompanying drawings.

Figure 1:
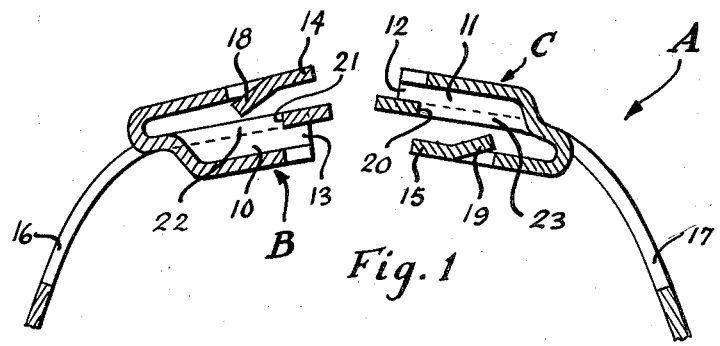
Figure 1 is an enlarged fragmentary sectional view of the free ends of a poultry band according to the present invention showing the co-operating housings disposed in a position ready for inter-engagement.

Referring to the drawings, A indicates a poultry band having free ends which carry the co-operating and inter-engageable housings B and C, which embody the wholly enclosed receiving chambers 10 and 11 disposed in different planes to one another or on opposite sides of the plane of the band. These chambers are formed by dieing a portion of the bands inwardly of their extremities to form the offset housings having the entrance openings 12 and 13. Locking tongues 14 and 15 are formed and disposed on the opposite side of the band to that of the housing formed on the same end of the band and the tongues are formed by dieing out a portion of the band leaving the openings 16 and 17 therein. The tongues 14 and 15 are of a width corresponding to the width of the openings 12 and 13 of the housings and by reason of the fact that they are disposed on the opposite side of the band to the housing carried on the same end, these tongues are, therefore, poised directly opposite to the openings 12 and 13 respectively, of the chambers 10 and 11 of the housings. Therefore, when the ends of the band are poised in the position shown in Figure 1, movement of the ends towards each other will result in the tongue 14 entering the entrance 12 of the housing C and the tongue 15 in the entrance 13 of the housing B.

The tongues 14 and 15 have a sloped locking projection 18 and 19 respectively struck therefrom and disposed to slope inwardly thereof.

Figure 2:
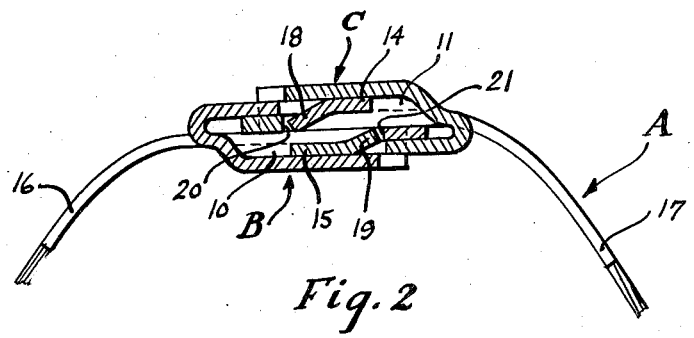
Figure 2 is a similar view to Figure 1 but showing the co-operating housings in inter-engagement to securely lock the free ends of the band together.

Therefore, when the tongues are caused to enter into the housings B and C respectively, the sloped tongues, as shown in Figure 2, will slide easily to normal locked position when the sloped ends thereof will project to overlap the shoulders 20 and 21 formed in the plane of the band and disposed at one end of the openings 22 and 23, which are formed in the band when the housings are died from the plane thereof.

Figure 3:
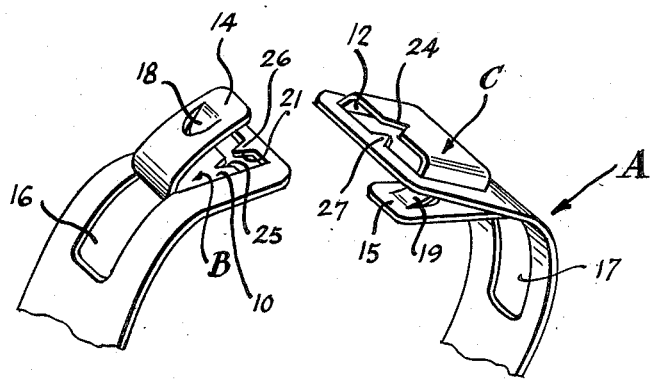
Figure 3 is an enlarged fragmentary perspective view of the band showing the housing ends thereof poised opposite one another for inter-engagement, parts of each of the ends being bent slightly out of normal position in order to illustrate other parts thereof more clearly.

A reference to Figure 3 will show that the housings B and C are died out in such a manner as to form the notches 24 and 25 and thus leaving the pointed projections 26 and 27 in the plane of the band and which, in fact, in the preferred form provide the shoulders 20 and 21. This means that the point of engagement between the sloped locking projections 18 and 19 with the shoulders 20 and 21 is spaced inwardly from the outer free end of each housing and consequently, the locking engagement of these elements is well within the enclosed housing.

It is obvious that the entrance openings 12 and 13 to the housings provide a good target for the tongues 14 and 15 and, therefore, the band may be applied in a very quick and simple operation and when the housings are inter-engaged with their co-operating tongues, the band as shown clearly in Figure 2 is positively locked. A pull in the opposite direction merely causes the locking projections to engage the shoulders 20 and 21 which will resist any attempt to disengage the inter-locked ends of the band. Moreover, by reason of the enclosed housings B and C, the inter-locked parts are tamper-proof because it is impossible to get a tool into the internal structure without completely distorting the structure which, of course, would indicate that tampering had occurred.

Figure 4:
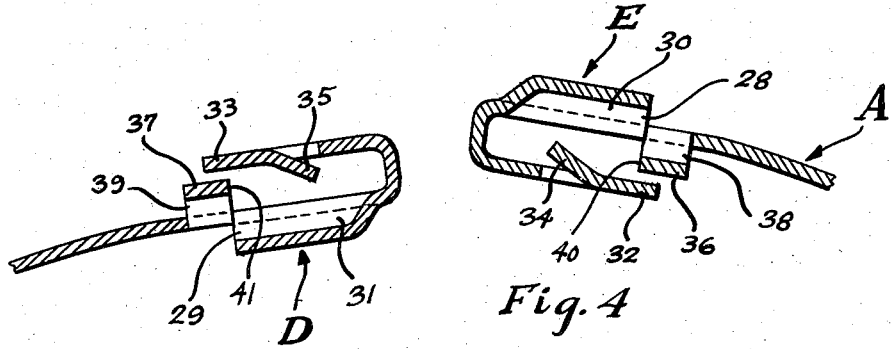
Figure 4 is an enlarged fragmentary sectional view of an alternative form of band showing the ends thereof disposed as in Figure 1.
Figure 5:
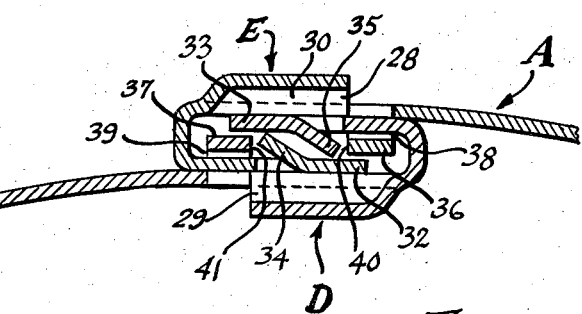
Figure 5 is an enlarged sectional view of the ends of the band illustrated in Figure 4, showing them inter-locked as in the case of Figure 2.
Figure 6:
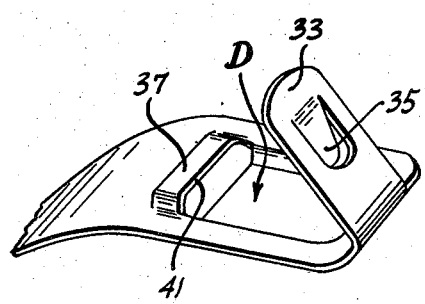
Figure 6 is an enlarged fragmentary perspective view of the ends of the band of this alternative form of construction with parts slightly bent out of position such as in Figure 3 to illustrate the construction to better advantage.

Referring to Figures 4 to 6, which illustrates an alternative construction, it will be obvious that a similar principle is involved. The ends of the band are provided with housings D and E of similar character with the exception that the entrance openings 28 and 29 of the receiving chambers 30 and 31, are disposed in the opposite direction. In this structure, the tongues 32 and 33 are bent from the end of the band and also are disposed in the opposite direction. Each of these tongues is provided with the sloped locking projections 34 and 35 respectively. At the inner end of the housings D and E adjacent to the openings 28 and 29, the band is died in the opposite direction to project therefrom a transverse bar 36 and 37 respectively, having an entrance opening 38 and 39 respectively and forming a shoulder 40 and 41 respectively along the opposite edge of the bar in each case, designed to be engaged by the locking projections 34 and 35.

To engage the ends of the band together they are overlapped one with the other so that the tongue 32 is disposed opposite the entrance opening 39 and the tongue 33 disposed opposite the entrance opening 38. Therefore, upon pulling the ends of the bands in the opposite direction, the tongues will pass through these entrance openings to dispose the locking projections 34 and 35 in the position shown in Figure 5 where they are disposed directly adjacent to the shoulders 40 and 41 and consequently, the ends of band cannot be disengaged once inter-locking engagement has been effected.

It will be apparent that the structure as disclosed in Figures 4 to 6 likewise presents a good target and furthermore, that the inter-locked parts are fully enclosed to provide a poultry band which cannot be unlocked once locked without obviously distorting the band to indicate tampering.

From the foregoing, it will be clear that I have provided a simple type of locked and tamperproof poultry band which will provide advantages generally over the prior art.

What I claim as my invention is:

1. A self-locking poultry band comprising a strip of material designed to be bent substantially to the form of a circle having free ends disposed adjacent to one another, each of the free ends having a housing died therefrom and offset from the plane of the strip, the housing of one end being offset to one side of the strip the housing of the other end of the strip being offset from the opposite side of the strip, each housing having an entrance opening thereto, a tongue formed on each end of the strip, the tongue of one end being offset to one side of the plane of the strip opposite to that of the other end of the strip, said tongues being disposable directly opposite to the entrance opening to the housing on the opposite end of the strip, a shoulder formed by a portion of the strip adjacent to each housing and a sloped locking projection formed in each tongue disposed to slope inwardly therefrom towards the plane of the strip, said tongues being movable into and through the entrance openings for each of said housings to locate said locking projections therewithin, the ends of the latter being designed to locate in the plane of said shoulders and to engage the latter whereby to lock said tongues within the housings and thereby lock the ends of the band in inter-engaged relation.

2. A self-locking poultry band as claimed in claim 1, in which the tongues have free ends disposed towards the opposite end of the band and the entrance openings to the housings are disposed towards the opposite end of the band so that said tongues will enter the housings when the ends of the band are moved towards each other.

3. A self-locking poultry band as claimed in claim 1, in which the tongues have a free end disposed in a direction away from the opposite end of the band and in which said entrance opening to each housing is disposed to face away from the opposite end of the band, said free ends of the band being designed to be overlapped to dispose each tongue in line with the entrance opening to the opposite housing, said tongues being caused to enter the housings when the overlapped ends of the band are pulled in a direction away from each other.

4. A self-locking poultry band as claimed in claim 1 in which said shoulder is formed by a portion of the strip adjacent to the open ends of the housing and which demarks the strip from the housing at the entrance opening thereto.

5. A self-locking poultry band as claimed in claim 1 in which said shoulder is formed by a bar-like portion of the strip depressed and spaced therefrom at a point adjacent to the entrance to the housing, the spacing between the bar-like member and the strip forming a passage through which each tongue may pass through to locking engagement with the shoulder within the housing.

6. A self-locking poultry band as claimed in claim 1 in which said shoulder is formed by a portion of the strip adjacent to the open ends of the housing and which demarks the strip from the housing at the entrance opening thereto, a portion of said housing being notched to leave in the strip as part of said shoulder a projection projecting within the housing and which forms the shoulder engagement with each locking projection at a point well within the confines of the housing.

ALEXANDER S. MACKEY.

REFERENCES CITED

The following references are of record in the file of this patent:

UNITED STATES PATENTS

| Number | Name | Date |
|---|---|---|
| 196,621 | Barion | Oct. 30, 1877 |
| 303,417 | Brooks | Aug. 12, 1884 |
| 720,286 | Schild | Feb. 10, 1903 |
| 1,024,566 | Gifford | Apr. 30, 1912 |
| 1,249,959 | Hodges | Dec. 11, 1917 |
| 1,759,550 | Friedlander | May 20, 1930 |
| 1,934,341 | Brooks | Nov. 7, 1933 |
| 2,103,292 | Leach | Dec. 28, 1937 |
| 2,337,729 | Ashton | Dec. 28, 1943 |
| 2,341,608 | Gey | Feb. 15, 1944 |

FOREIGN PATENTS

| Number | Country | Date |
|---|---|---|
| 49,722 | Netherlands | July 15, 1940 |
| 297,176 | Great Britain | Sept. 20, 1928 |